United States Patent
Klein et al.

(10) Patent No.: US 7,185,941 B2
(45) Date of Patent: Mar. 6, 2007

(54) SEALING AND/OR LOCKING SYSTEM FOR VEHICLES WITH A VEHICLE OPENING ON THE BODY STRUCTURE

(75) Inventors: Berthold Klein, Rutesheim (DE); Dieter Raisch, Rutesheim (DE); Wojciech Wezyk, Sindelfingen (DE)

(73) Assignee: Magna Car Top Systems, GmbH (DE)

( * ) Notice: Subject to any disclaimer, the term of this patent is extended or adjusted under 35 U.S.C. 154(b) by 0 days.

(21) Appl. No.: 11/333,705

(22) Filed: Jan. 17, 2006

(65) Prior Publication Data
US 2006/0186692 A1 Aug. 24, 2006

Related U.S. Application Data

(63) Continuation of application No. PCT/EP04/07887, filed on Jul. 15, 2004.

(30) Foreign Application Priority Data

Aug. 1, 2003 (DE) .............................. 103 35 999
Oct. 29, 2003 (DE) ........................... 203 16 690 U

(51) Int. Cl.
*B60J 7/185* (2006.01)
(52) U.S. Cl. ................. 296/121; 296/107.04; 49/477.1

(58) Field of Classification Search ............... 296/29, 296/146.9, 121, 107.4, 107.01, 107.17; 292/DIG. 23, 292/307, DIG. 3; 277/389, 637, 646; 49/477.1
See application file for complete search history.

(56) References Cited

U.S. PATENT DOCUMENTS

| | | | |
|---|---|---|---|
| 2,104,144 A | | 1/1938 | Zand |
| 3,110,065 A | | 11/1963 | Dennis |
| 4,313,609 A | * | 2/1982 | Clements ..................... 277/646 |
| 4,371,175 A | * | 2/1983 | Van Dyk, Jr. .............. 49/477.1 |
| 5,046,285 A | * | 9/1991 | Fratini et al. .............. 49/477.1 |
| 5,209,498 A | * | 5/1993 | Colin ........................ 49/477.1 |
| 6,029,977 A | * | 2/2000 | Sym ......................... 277/646 |
| 2006/0010779 A1 | * | 1/2006 | Schlachter et al. ........ 49/477.1 |

FOREIGN PATENT DOCUMENTS

| | | |
|---|---|---|
| DE | 1236953 | 3/1967 |
| DE | 1970168 | 10/1967 |
| DE | 1430936 | 7/1969 |

* cited by examiner

*Primary Examiner*—Jason Morrow
(74) *Attorney, Agent, or Firm*—Brooks Kushman P.C.

(57) ABSTRACT

A selectively pressurized sealing and/or locking system for vehicles with a vehicle opening on the body structure. Vehicle elements that are to be sealed and/or locked in relation to one another are attached by locking elements. The locking elements have positive-engagement elements that define a hollow portion and a stiffening bridging part in a transitional area between parts of the vehicle that are to be connected together.

25 Claims, 6 Drawing Sheets

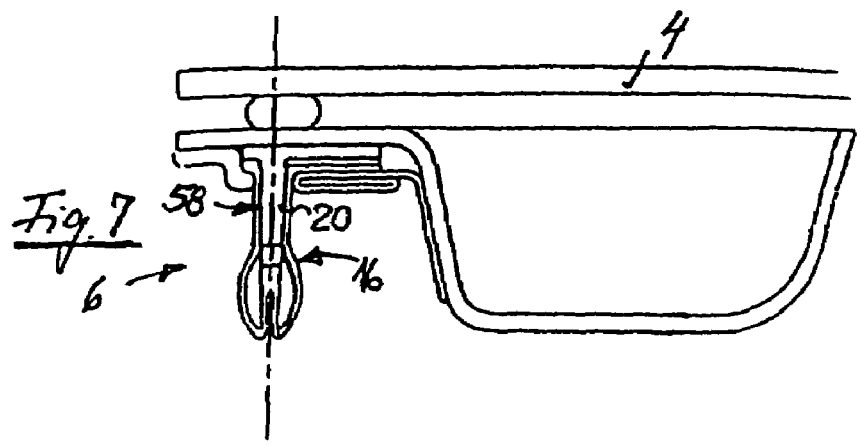
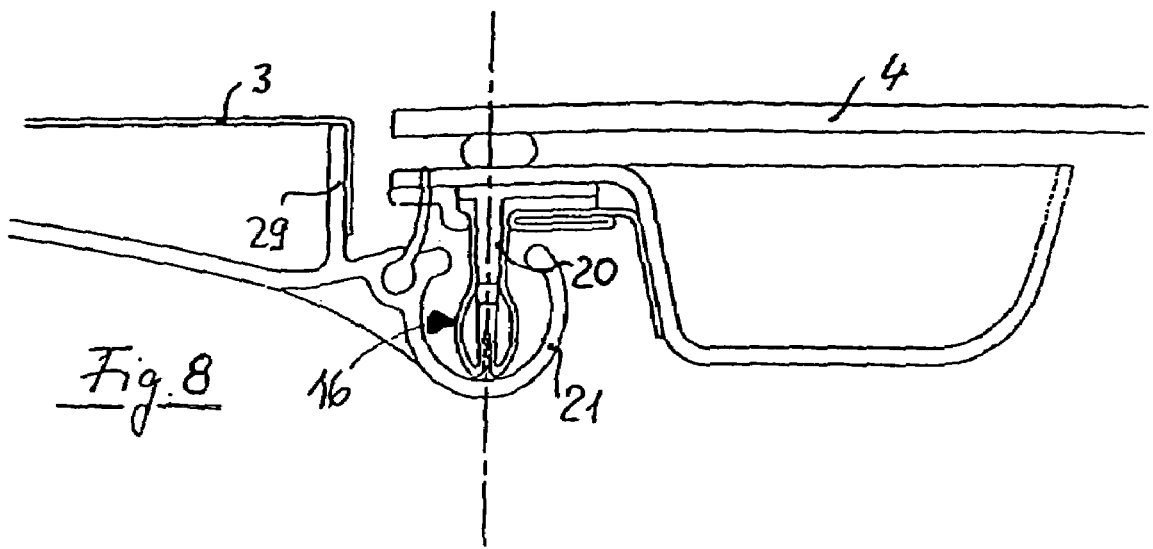
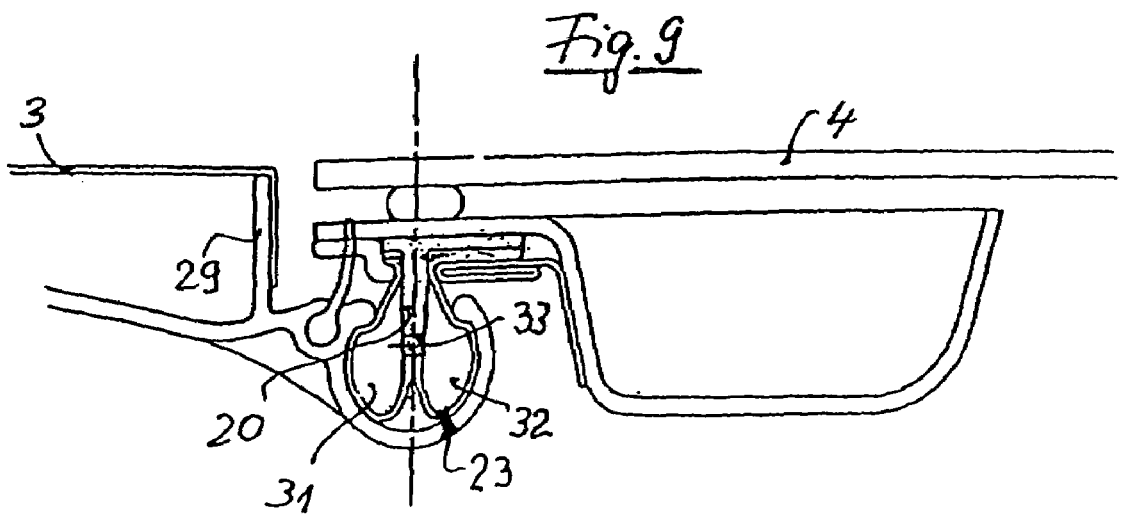

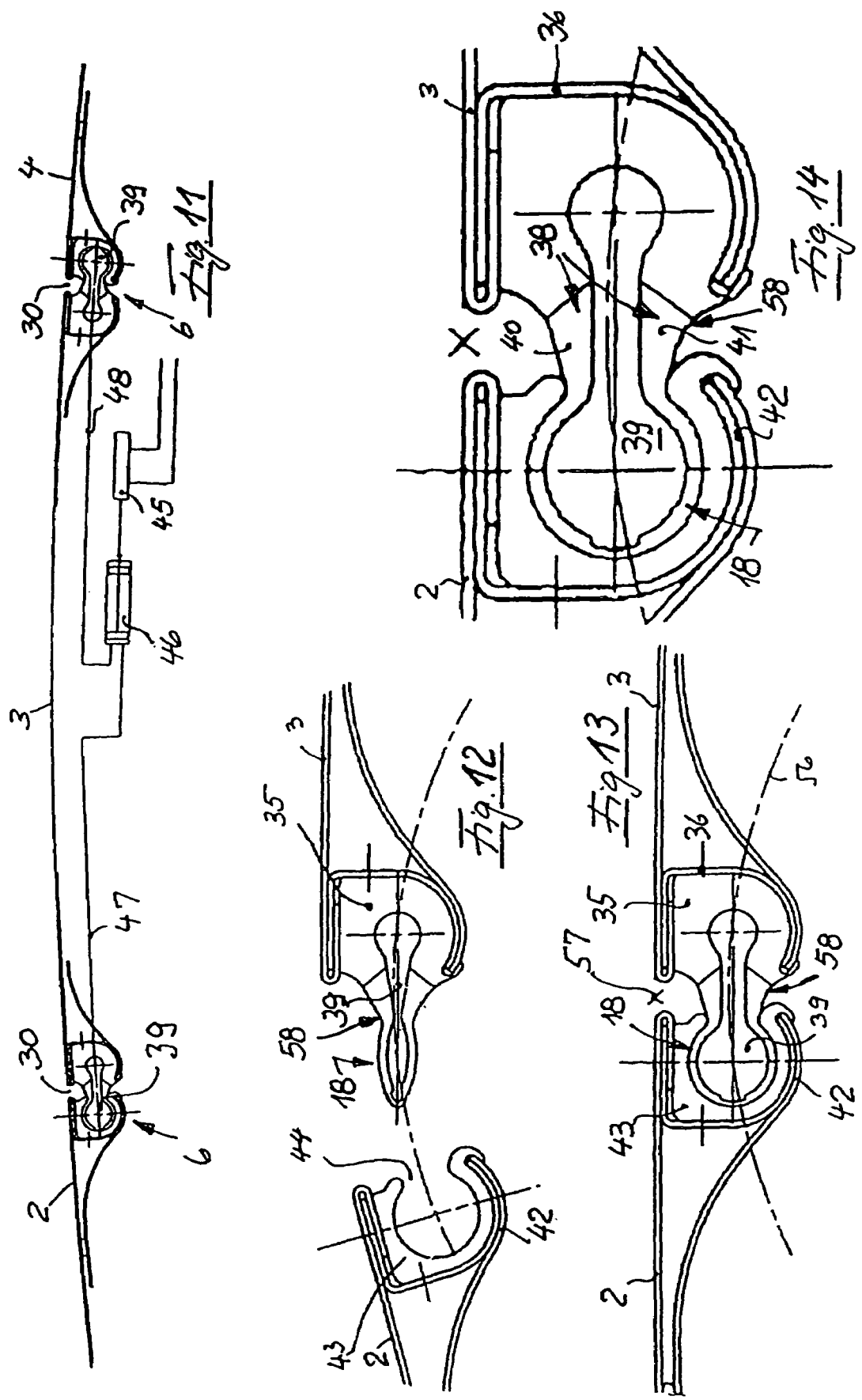

SEALING AND/OR LOCKING SYSTEM FOR VEHICLES WITH A VEHICLE OPENING ON THE BODY STRUCTURE

CROSS REFERENCE TO RELATED APPLICATION

This application is a continuation of PCT application Serial No. PCT/EP2004/007887, filed Jul. 15, 2004.

BACKGROUND OF THE INVENTION

1. Field of the Invention

This invention relates to a sealing and/or locking system for vehicles with a vehicle opening on the body structure, in particular a roof or door opening.

2. Background Art

Vehicles having sealing and/or locking systems for an opening are previously disclosed in DE-PS 1 236 953, which provides for a door as a covering for a door opening. The door, as an adjoining component, is sealed against and locked in relation to the door frame via a door seal. The door seal is executed as an elastic, positive-engagement hollow profile that is capable of varying its cross-section depending on the internal pressure. The door seal may be connected to a pressure source and is fixed to the door by an accommodating groove that serves as a holder. In the covering position for the vehicle opening, that is when the door is closed, a channel for the holder on the door is provided in the door frame as an adjoining component attached to the body. The channel receives the door seal that is subjected to internal pressure as a positive-engagement hollow profile. Mutual engagement of the cover and the adjoining component, that is to say in the door and the door frame, results in a positive-engagement connection being achieved by the seal in addition to the sealing function.

In another embodiment, the door seal has a sealing lip on the door and a hollow chamber profile. The hollow chamber profile may be expanded like an accordion depending upon the pressure. With the door closed, the sealing lip engages from behind with a locking shank projecting into the door frame as an adjoining component with the sealing lip making contact from the opposite side.

In DE-AS 1 430 936, furthermore, an arrangement is disclosed for sealing vehicle doors that cover a door opening in the closed position and is braced against the door frame as an adjoining component via the door seal. The door frame is provided with a channel-shaped receiving means, in which the door seal has a positive-engagement hollow element that is retained by an externally applied base structure. The hole-like door seal is attached to a pressure source and is subjected to pressure for the purpose of bracing the door in the door frame. Application of a partial vacuum causes the door seal to contract and releases the door enabling it to be opened.

U.S. Pat. No. 2,104,144 discloses a device for sealing and locking an aircraft door which, when closed, covers the door opening provided in the outer skin of the aircraft. The door and the door frame are provided with corresponding recesses around their mutually bordering wall surfaces with the door closed. The recesses have a hollow profile in which a sealing tube lies to provide a positive-engagement hollow element. The sealing tube, depending on the internal pressure applied as a positive pressure, secures the door in its closed position at an internal pressure exceeding atmospheric pressure by mutual engagement in the recesses. The sealing tube recedes or can be forced back into the recess on the frame to such an extent that the door is capable of being opened at an internal pressure at or below atmospheric pressure.

SUMMARY OF THE INVENTION

One object of the invention is to provide a sealing and/or locking system that is suitable in particular for covers provided for openings in the roof of vehicles in the form of soft tops or hard tops. The invention may also provide for the sealing and/or locking of individual roof elements in relation to one another and also in relation to the body elements.

A protective, stiffening and/or accommodating sealing and/or locking connection can be achieved between the cover and the adjoining component, irrespective of the variability of the cross-section, flexibility, and elasticity of the positive-engagement hollow element. The connection is executed at the same time in such a way that, when the cover and the adjoining component are brought together, it offers an aid to passage and, with the components in the condition in which they have been brought together, it is capable of acting as a means of protecting engagement and gripping. In accordance with the invention, arrangements are also available which provide protective screening for the positive-engagement hollow element which is dependent on the internal pressure.

Also within the scope of the invention are arrangements which permit local locking, as well as solutions which have a sealing and/or locking effect in a linear or linear and two-dimensional fashion.

The bridging components with a stiffening, protecting and/or guiding function may have supports and/or stays. The stays in conjunction with linear sealing and/or locking systems may be provided, for example, between consecutive roof parts of a hard top for vehicles or also in the attachment to the body of a front roof part of a roof that is capable of being opened. The systems may be applied to the windscreen cowl top panel of the body.

By connecting a bridging part to the base structure, a supporting frame is produced that is preferably flexible, but not unstable. The bridging part is able to lie within the positive-engagement hollow element or may also form a wall part of the positive-engagement hollow element.

It is accordingly possible, preferably for local solutions and in particular for solutions which exhibit a locking function, for the bridging part to be executed as a support. The support is essentially enclosed by positive-engagement hollow elements, so that when the positive-engagement hollow element is subjected to an internal pressure it expands like a balloon. The expanding hollow element may be received in an adjoining component for locking and bracing purposes. The balloon-like positive-engagement hollow element is capable of making contact with the base and, with regard to a mushroom-shaped expansion, can preferably be connected to the freely extending end of the support that is situated remotely from the base. The support may be a guide channel by which corresponding connections may run to the pressure source. In the case of a two-dimensional stay-like execution of the support, this can also be utilized for the purpose of subdividing the balloon-like positive-engagement hollow element into two chambers for the purpose of stiffening it in the direction in which the stay extends.

A central, support-like stiffening structure, may have a bridging part to a mushroom-like tensioning and locking element. A bridging part with an identical basic construction having an elongated stay-like stiffening structure, depending on the length of the stay, may form a linear sealing and/or locking element with mutually opposing chambers. The chambers can be connected to one another and the pressure source, or a separate supply can be provided for each chamber.

Unlike a design of the locking element, in which the stay-like stiffening structure lies like a bridging part between the chambers more or less on a symmetrical level, it is also possible to envisage an asymmetrical structure for the bridging part, in which only a single chamber is provided. In this arrangement, the bridging part forms an external chamber wall acting simultaneously as a bearing wall and a supporting wall. The bridging part can, for example, also form a protective gap cover facing towards the outside of the roof. The bridging part may be provided with fiber inlays and/or "coatings." For example, a reinforcement may be provided in mesh form that comprises a wire or fabric mesh.

In conjunction with stay-like designs of the bridging part and a linear path of the positive-engagement hollow element which assumes the form of a tube under pressure, it is possible to provide the bridging part in slotted form. The bridging part may form a transitional component with shanks to which the correspondingly slotted tube is attached with its slot edges. The shanks of the transitional component extend into the base structure preferably with an increasing wall cross-section to form extensions of the tube shanks.

The positive-engagement hollow element, the transitional part and also parts of the base structure can provide the definition of a cavity. Subjecting this cavity to pressure, with regard both to the base structure and to the hollow element, leads to improved positive-engagement contact. The internal pressure in combination with the cover and the adjoining component preferably through the elasticity of the material, provides a base structure in which the positive-engagement hollow element and also the adjoining transitional component form the bridging part. Mutually opposing wall parts move towards one another in the presence of a partial vacuum and, if necessary, make contact with one another. A narrow outlet is provided, which facilitates passage into a corresponding receiving means with an undercut execution.

The transitional part can be formed by sections of the shanks having a reinforced cross-section or by narrowing wall parts of the base structure. The transitional part forms a gap cover which, on the one hand, provides adequate flexibility and, on the other hand, also provides adequate protection. The transitional component and the positive-engagement element may be subjected to a positive pressure. Alternatively, a partial vacuum may be provided that may lead to a constricting effect which facilitates bringing together the cover and the adjoining component.

Further details and characteristics of the invention may be appreciated by one of ordinary skill in the art. The invention is described below in greater detail with reference to the illustrated embodiments.

BRIEF DESCRIPTION OF THE DRAWINGS

FIGS. 7 and 8 are representations corresponding to FIGS. 5 and 6, in which the positive-engagement hollow element is arranged on the rear roof part which is introduced into a receiving means on the center roof part and is secured in the receiving means in a sealing and locking fashion when subjected to internal pressure.

FIG. 9 shows, in relation to the connection of the center roof part to the rear roof part in accordance with FIGS. 7 and 8, the sealing and locking engagement of the positive-engagement hollow element, when the receiving means of the center roof part is subjected to internal pressure.

FIG. 10 shows the rearward area of the rear roof part in its locked position relative to the structure of the vehicle through the engagement of the positive-engagement hollow element of the rear roof part in a receiving means on the package shelf or in a part of the body shell of the vehicle.

FIG. 11 shows a further, simplified and schematized representation of the hard top, similar to FIG. 2, in which the roof parts of the hard top are attached to one another in a sealing and locking fashion via positive-engagement hollow elements, which extend in the longitudinal direction of the roof in order to bridge the gap between consecutive parts of the roof, and which, when subjected to internal pressure, lock the parts of the roof to one another.

FIGS. 12 and 13 illustrate the manner in which consecutive parts of the roof are brought together, and after locking the roof parts to one another.

FIG. 14 shows an enlarged representation of the positive-engagement hollow element for locking together consecutive parts of the roof.

DETAILED DESCRIPTION OF THE PREFERRED EMBODIMENT(S)

Figure 1:
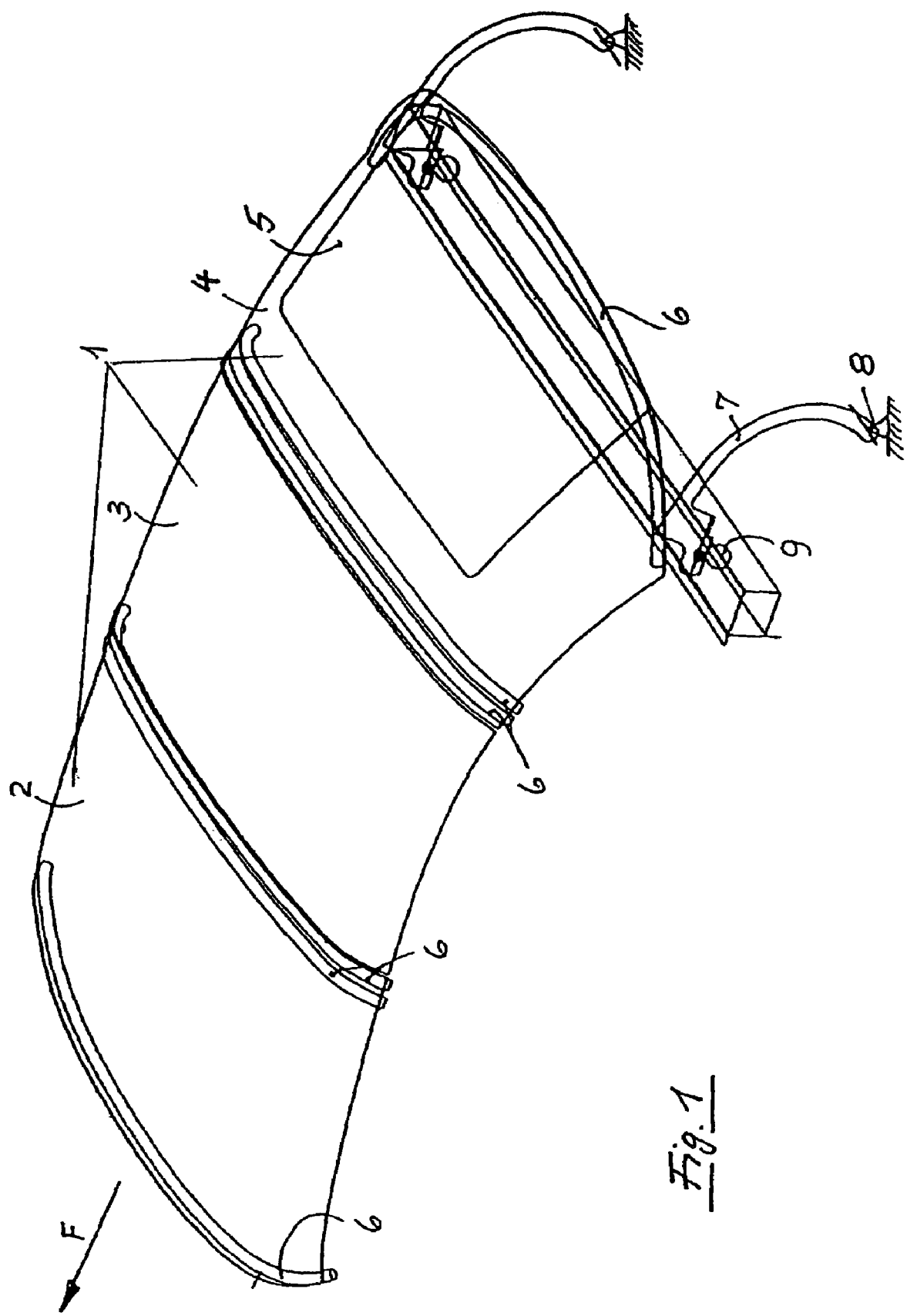
FIG. 1 is a simplified perspective view of a passenger car with an open construction, a roof covering its interior in the form of a hard top having three roof parts attached to one another in the longitudinal direction of the vehicle and a schematic representation of the sealing and locking system, by means of which the roof parts with the roof closed are connected together and are attached to the body in the longitudinal direction of the vehicle.
Figure 4:
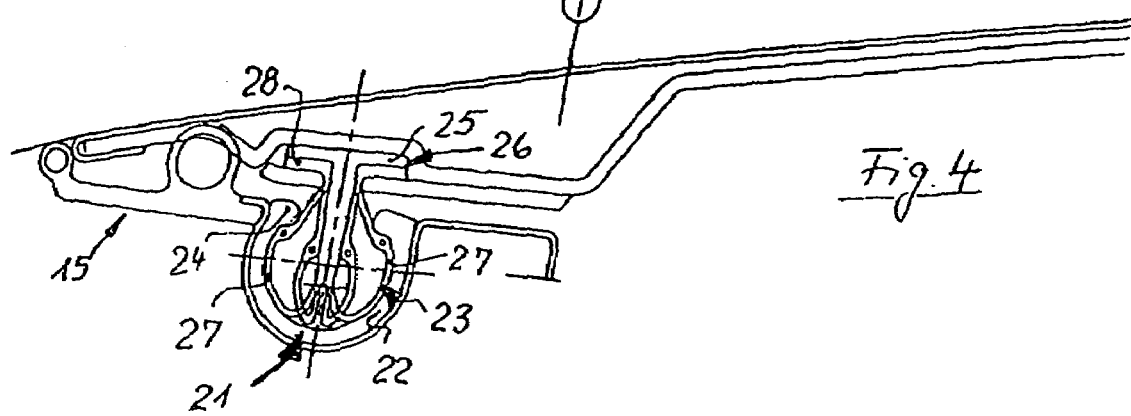

The roof 1 of a passenger car with an open body, otherwise for the most part not illustrated here, is represented in isolation in FIG. 1. The roof 1 is designed as a hard top and comprises—as parts of the roof cover—three roof parts 2, 3, 4, which are inherently dimensionally stable. Roof part 2 constitutes a front roof part in relation to the direction of travel F, which roof part, as illustrated in FIG. 4, is attached to the windscreen cowl top panel 15 running above the windscreen of the vehicle. The rear roof part 4 comprises a rear window 5 and is attached to the body structure, in relation to the direction of travel F, in the vicinity of the transition to the rear bodywork of the vehicle. The rear body work may be constituted, for example, by a trunk lid, in conjunction with which the connection, as shown in FIG. 10, can be effected to a package shelf 34 or a part of the body shell of the vehicle.

Locking elements, generally identified with the designation 6, are provided in each case at the transition between the roof parts 2, 3, 4, and also at the attachment of the front roof part 2 to the windscreen cowl top panel 15 and of the rear roof part 4 to the rear bodywork. The locking elements 6 provide a sealing function and are formed by elongated and elastic, positive-engagement hollow elements 16, 18 and 19 that are capable of varying their cross-section depending on the internal pressure.

FIG. 1 illustrates, in a highly schematized form having regard for the adjustment kinematics of the roof 1, arms 7 which engage the rear roof part 4 and a longitudinally extending side of the vehicle. The arms 7 have an articulated attachment to the bodywork at 8 that is indicated schematically. A plurality of solutions are disclosed for permitting adjustment of the roof parts 2 to 4 in relation to one another that can be utilized as the need arises. The same also applies to the adjustability of the roof 1 as a whole. The articulated attachment of the arms 7 shown here is envisaged only as an example. The arms 7 may be locked in position corresponding to the closed position of the roof 1 by means of locking elements 9. Locking element 9 may be spherical, positive-engagement hollow elements. Double locking elements 6, as represented in FIG. 16, are shown for the locking elements 6 lying between the center roof part 3 and the front roof part 2. Double locking elements may also be provided in the rear roof part 4 in the representation in accordance with FIG. 1. It is also within the scope of the invention to provide only a single locking element in each case in the attachment of the roof parts 2 to 4, analogous to the representation in FIG. 15.

Figure 2:
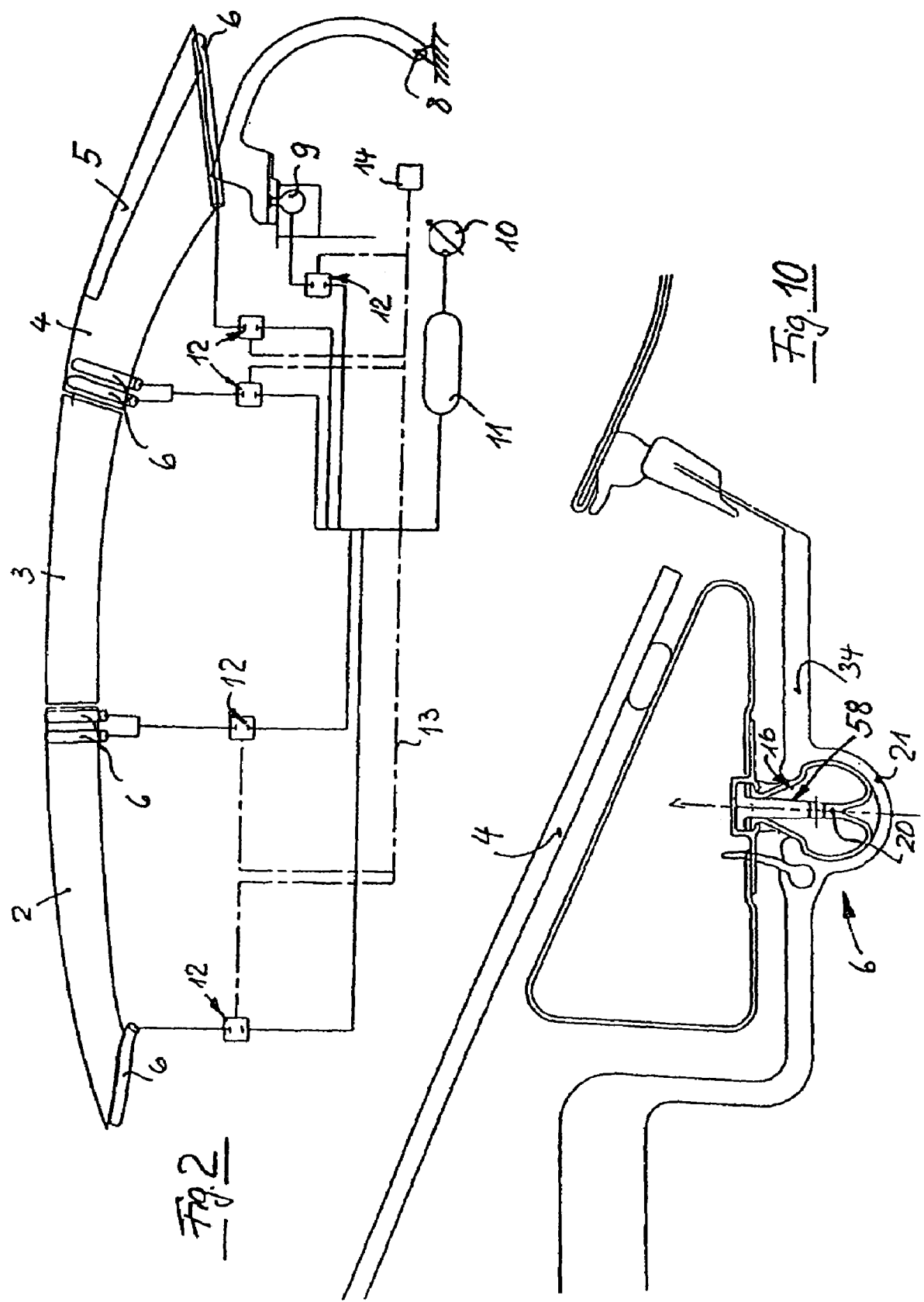
FIG. 2 is a side view of a schematic representation of a hard top in accordance with FIG. 1 with a schematic representation of the control and supply device for the sealing and/or locking system.

With regard to the representation in accordance with FIG. 1, FIG. 2 shows an arrangement for the pressure supply to the locking elements 6 and 9. A pneumatic pressure supply is provided in the illustrative embodiment, although other fluids may be used in principle. The compressor utilized as the pressure source is identified with the designation 10, that discharges into a storage reservoir 11. The supply of pressure to, and the evacuation of the positive-engagement hollow elements used as locking elements 6 and 9, is effected via valves 12 that are indicated only symbolically. The valves can be designed in a simple fashion as two 2-way valves, to which control lines 12 represented here as a dot-dash line, which are capable of being controlled together, for example by a switch 14. It is also clearly within the scope of the invention to control the locking elements 6 and 9 so that locking between the individual roof parts and/or to the body is effected and released individually.

Figure 3:
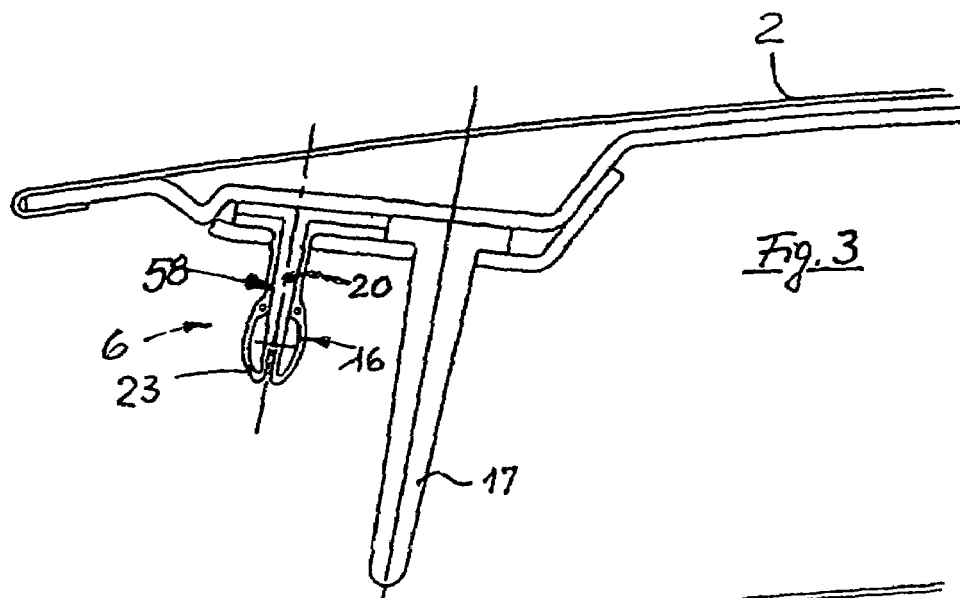
FIGS. 3 and 4 are mutually corresponding schematic sectional representations of the front section of the front roof part as it approaches the windscreen cowl top panel of the vehicle to which it is attached in a locking and sealing fashion.

FIGS. 3 and 4 illustrate the arrangement of a locking means between the front roof part 3 and the windscreen cowl top panel 15 of the body running above the windscreen. FIG. 3 shows a positive-engagement hollow element 16 in its evacuated state as a locking element 6. A guide pin 17 is also provided as a supplement to the locking element 6. A corresponding and matching receiving means (not shown in FIG. 4) is provided for adjustment purposes in the windscreen cowl top panel 15.

Alignment and adjustment through the positive-engagement hollow elements 16 themselves is also within the scope of the invention. The hollow elements 16 can also exhibit an arrangement of the kind represented in the applications in FIGS. 4 to 10, as illustrated with reference to FIGS. 11 to 14, and with reference to FIG. 17.

Embodiments of the kind illustrated in FIGS. 11 to 14 for positive-engagement hollow elements 18 may be used as locking elements. Embodiments illustrated in FIG. 17 for positive-engagement hollow elements 19, are particularly suitable to assume a guide function as an aid to passage. Positive-engagement hollow elements 18, 19 executed in this manner also lend themselves particularly well for use as a gap-bridging means, as illustrated in FIG. 11. The positive-engagement hollow elements 18, 19 can be of strengthened and, if necessary, may be reinforced in the area bridging the gap, whereby they are also capable of affording protection against forcible penetration.

Positive-engagement hollow elements in accordance with the invention can be used in principle both as local locking elements, for example with a spherical basic form, or as linear locking and/or sealing elements, as illustrated by the representations in accordance with FIGS. 3 to 14. Contrary to the illustrated elongated arrangements of the positive-engagement hollow elements 16 and 17, rotationally symmetrical arrangements are also possible while retaining the basic construction.

In accordance with FIGS. 3 to 10, each of the locking elements 6, 9 exhibits a bridging part 58, which, in relation to positive-engagement hollow elements 16, is formed in each case by a central stiffening structure 20, which can be formed by stays or supports.

If the central stiffening structure 20 is formed by stays, and in particular by a stay running continuously in each case for the entire length of the sealing, positive-engagement hollow element 16, a subdivision of the positive-engagement hollow element 16 into two chambers can be effected via the stay. The chambers may be supplied separately with pressure, in conjunction with which it lies within the scope of the invention to provide a separate pressure supply for each of the chambers, analogous to the representation in accordance with FIG. 2.

It is also within the scope of the invention to provide an elongated locking element 6 in the form of a positive-engagement hollow element 16, with bulkheads, and to supply the individual longitudinal sections that are separated by the bulkheads separately.

The latter is also possible, in particular in arrangements in which the central stiffening structure 20 is effected not by stays running in the longitudinal direction, but rather by supports arranged at distances in the longitudinal direction.

Locking elements 6 with a stiffening structure 20 in the form of a stay or a support can serve both as an aid to passage when bringing together the roof parts 2, 3 and 3, 4, and as a means of support against a peripheral area of a receiving means 21 for the positive-engagement hollow element 16. A receiving means 21 for this purpose is shown in FIGS. 3 and 4 and is allocated to the windscreen cowl top panel 15. The receiving means 21 has a lining 22 which is formed by, for example, a component part made of plastic, rubber or the like exhibiting an essentially U-shaped cross-section, which part is of undercut execution in relation to the passage opening. Locking and/or sealing can be achieved via the positive-engagement hollow element 16 in the inflated state.

The positive-engagement hollow element 16 exhibits a pressure-dependent, spreadable enclosure 23 (shown inflated in FIG. 4 and not inflated in FIG. 3) that is also capable of varying its cross-section. The enclosure 23 is preferably elastic and when lying in the receiving means 21 is supported against the direction of insertion in such a way as to engage behind the drawn-in peripheral zone 24 of the lining 22.

In the embodiment illustrated in FIGS. 3 and 4, the central dimensionally stable bridging part 58 between the parts to be connected together is executed as a stay-like stiffening structure 20. The structure 20 is attached via a broadened base structure 25 to a holding means 26 for the front roof part 3. Opposite the holding means 26 of front roof part 3, the receiving means 21 is disposed on roof part 2 that is locked to the windscreen cowl top panel 15. The receiving means 21 may be disposed on the windscreen cowl top panel 15 as a component bordering on the front roof part 2.

The enclosure 23 of the positive-engagement hollow element 16 is represented as a balloon-like, expandable casing, which is formed with the central stiffening structure 20. The central stiffening structure 20 forms a stay that extends at its end opposite the base structure 25 in the form of two-dimensional, flexible and, in comparison to the stay, thin-walled and more or less lobe-like wall parts. The wall parts are identified with the designation 27 and are capable of being positioned on both sides of the stay and of being brought back onto the base structure 25. The freely extending end areas 28 of the wall parts 27 that are bent back in the direction of the base structure 25 make contact with the base structure 25 in the form of a flange and, together with the latter, can be braced against the roof part 2.

The positive-engagement hollow element 16 of this kind may be manufactured in a simple fashion and easily assembled. The pressure supply can be effected via the central stiffening means 20 in a manner not illustrated here.

It also lies clearly within the scope of the invention to extrude a positive-engagement hollow element together according to the illustrated profile. It is also possible, starting from the base structure 25, to provide a freely situated area of the central supporting structure 20, above which the wall parts forming the enclosure 23 are in contact with the central lining 22. An arrangement of this kind may be particularly appropriate if the central stiffening structure 20 forms the guiding part, which in the locked state is supported against the adjoining component.

It is also within the scope of the invention to extend the central stiffening structure 20 in such a way that it projects beyond the enclosure. For example, the central stiffening structure 20 may form a passage component which narrows in the form of a cone. The structure 20 in conjunction with passage may form a screen for the contracted enclosure 23 lying behind it in the direction of passage.

Figure 5:
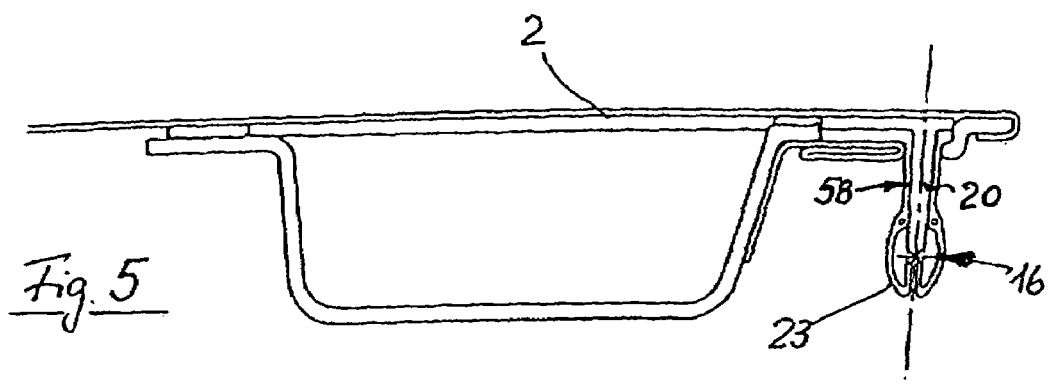
FIGS. 5 and 6 are mutually corresponding schematic sectional views that show the rearward area of the front roof part in its approach phase to the center roof part, in conjunction with which the front roof part and the center roof part approach one another in a vertical direction, and in conjunction with which a positive-engagement hollow element is allocated to the front roof part, which element, as illustrated in FIG. 6, engages a receiving means of the rear roof part and show the positive-engagement hollow element in a contracted state.
Figure 6:
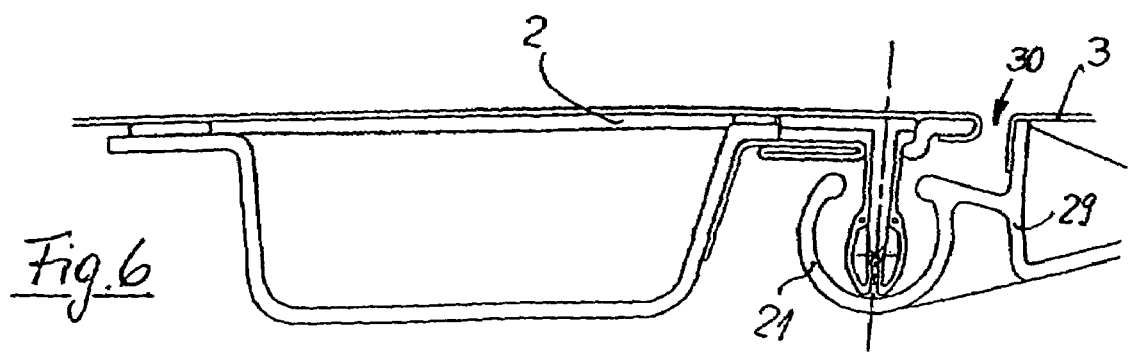

FIGS. 5 and 6 illustrate the arrangement of the locking element 6 between the front roof part 2 and the center roof part 3. The receiving means 21 is a constituent part of a peripheral profile 29 of the center roof part 3.

FIGS. 7 to 9 illustrate the steps for bringing together the center roof part 3 and the rear roof part 4. The roof parts 3 and 4 move towards one another essentially crosswise to their direction of extension and are locked in relation to one another in a sealing fashion, after the positive-engagement hollow element 16 has been inserted into the receiving means 21 as shown in FIG. 8. The hollow element 16 is locked in this inserted position in accordance with FIG. 9 by inflating the enclosure 23. Sealing the opening 30 between the roof parts 3 and 4 also locks the positive-engagement hollow element 16 laterally displaced in relation to the transition between the center roof part 3 and the rear roof part 4. The transition is covered by the rear roof part 4, so that it is largely protected against access and damage.

Covering the opening 30 towards the bottom does not take place via the positive-engagement hollow element 16, but via the frame part 29, which is provided on the center roof part 3 with which the receiving means 21 is associated.

FIG. 9 illustrates the central stiffening structure 20 in the form of a stay with the chambers 31, 32 situated on both sides of the central stiffening structure 20. The chambers 31, 32 are jointly capable of being provided with an internal pressure and are connected to one another via a cross link 33 in the central stiffening structure 20. It is also within the scope of the invention to dispense with such a cross link 33 and to provide the chambers 31 and 32 with pressure separately.

FIG. 10 illustrates in cross-section the linear, tube-shaped locking element 6 extending in the transition between the rear roof part 4 and the package shelf 34. The positive-engagement hollow element 16 engages a receiving means 21. In this embodiment, the receiving means 20 is arranged in the package shelf 34. Alternatively, the receiving means 20 may be provided in another part of the body, in particular in a part of the body shell.

The designation 9 is used in FIG. 1 to identify a locking element, which, as a locally operating locking element, does not exhibit an elongated, tube-shaped positive-engagement hollow structure, but rather a balloon-shaped positive-engagement hollow structure. The balloon-shaped embodiment may have a central stiffening structure that can be executed both as a stay and as a support, although in particular as a support. In this case, too, the execution as a stay also permits a subdivision into chambers that are capable of being supplied with pressure separately.

Figure 15:
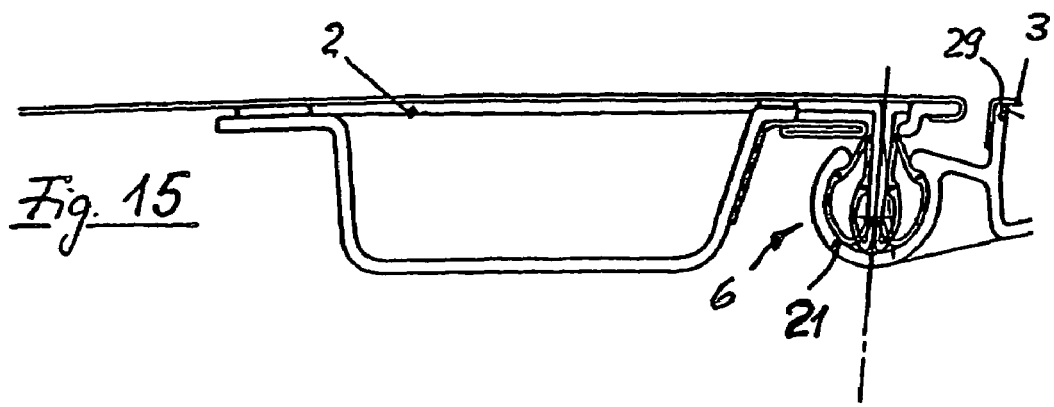
FIGS. 15 and 16, by comparison, show solutions in which consecutive roof parts, which are vertically adjustable in relation to one another, are locked in relation to one another via positive-engagement hollow elements in a single-chamber solution as shown in FIG. 15 and a two-chamber solution as shown in FIG. 16.
Figure 16:
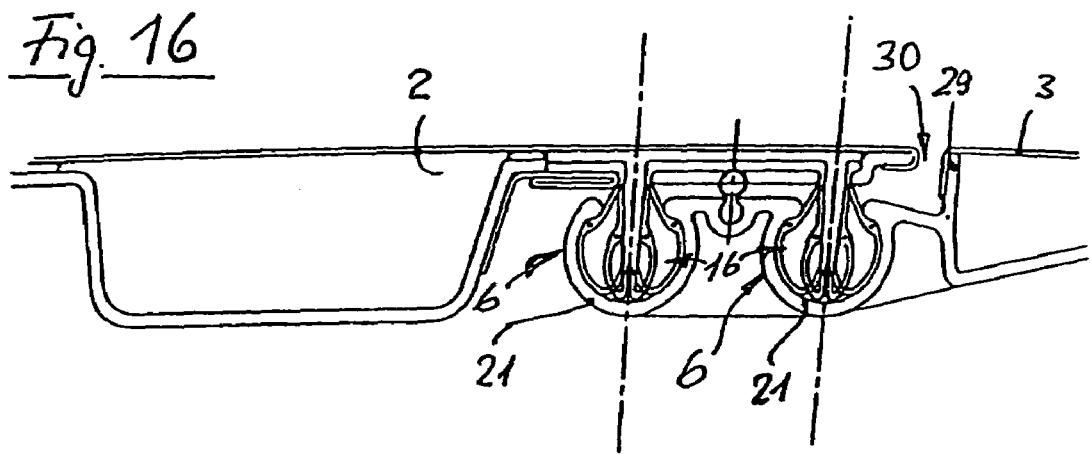

FIG. 15, as in the previous illustrative embodiments, illustrates the connection between two consecutive roof parts, in this case the front roof part 2 and the center roof part 3 which is effected via a locking element 6. As illustrated in FIG. 1, the locking element 6 extends in the form of a tube across the width of the roof. The locking element 6 engages a corresponding receiving means 21 which effects the connection between the roof parts 2 and 3 and the sealing of the transitional gap.

FIG. 16, on the other hand, illustrates an arrangement in which two consecutive roof parts 2 and 3, corresponding to the schematic representations in FIGS. 1 and 2, are attached via parallel-oriented, tube-shaped locking elements 6 of essentially identical construction. In this case, the locking elements 6 have positive-engagement hollow elements 16 that are associated with one of the roof parts. The associated receiving means 21 are attached to the center roof part 3. The receiving means 21 are in turn a constituent part of the peripheral profile 29 of the center roof part 3.

FIG. 16 discloses parallel locking elements 6 that both extend in the form of a tube over the width of the roof. It is also within the scope of the invention to provide a locking element 6, in particular the neighboring locking element 6 to the transition 30 between the roof parts 2 and 3, in the form of a tube, and on the other hand to execute the locking element 6 that is situated at a distance from the transition 30 in such a way that it extends only over parts of the width of the roof. Individual elements may be provided in accordance with FIG. 1 as balloon-like locking elements 9.

FIGS. 11 to 14 illustrate a sealing and/or locking system in accordance with the invention, in which the locking elements are oriented in such a way as to bridge the transitional gap 30 between consecutive roof parts 2, 3, 4. In this way, the sealing and/or locking system extends essentially in the direction of the level of the roof 1, and adopt their locking and/or sealing position by moving the roof parts 2 and 3 or 3 and 4 towards one another in the direction of the level of the roof.

The locking elements 6 in accordance with FIGS. 11 to 14 correspond in their function to those outlined above with reference to the illustrative embodiments already described. It is also possible in principle within the scope of the invention to use the locking elements 6 in each case with roof parts that are capable of being displaced in relation to one another in the direction of extension of the roof in accordance with FIG. 11. Roof parts may be provided that are able to move transversely to the direction of extension of the roof in order to effect the locking relative to one another in accordance with FIGS. 3 to 10. Likewise, locking elements 6 in accordance with FIGS. 11 to 14 can also be executed both as locally acting, as it were balloon-shaped locking elements, and as linearly extending, and in particular tube-shaped locking elements.

Locking elements 6 in the arrangement in accordance with FIG. 11 to 14 are also particularly advantageous and appropriate in devices in accordance with FIG. 11, in which the roof parts move towards one another in the direction of extension of the roof during effecting of the locking. With reference to FIGS. 12 and 13, the invention can also be used with roof parts following curved movement paths, as indicated along the arc 56 and with regard to a curve oriented in the opposite direction along the imaginary swiveling axis 57.

Each of the locking elements 6 in accordance with FIGS. 11 to 14 also exhibit a base structure 35, which is anchored to positively engage a holding means in one of the roof parts that are to be joined together. For example, roof parts 3 and 4 may be provided with a holding means 36 in roof part 4. Transitional part 38 engages as a bridging part 58 between the base structure 35 in the direction of extension of the locking element 6 and positive-engagement hollow element 18. The transitional part 38 is formed in a single piece joining the base structure 35 and the positive-engagement hollow element 18. The base structure 35, the positive-engagement hollow element 18, and the transitional part 38 define a cavity 39 in the form of a dog bone that extends in the longitudinal direction of the locking element 6. The cavity 39 continues from the interior of the positive-engagement hollow element 18, passing through the transitional part 38, and into the base structure 35, so that the transitional part 38 exhibits two mutually opposing shanks 40 and 41 in relation to the locking element 6 of the kind previously described, having the cross-section visible in FIGS. 12 to 14. Starting from the base structure 35, the shanks 40, 41 extend in the direction of the positive-engagement hollow element 18 with its tube-shaped cross-section.

FIG. 12 illustrates the positive-engagement hollow element 18 when no positive pressure is present, and also under the effect of a partial vacuum. In such conditions, the hollow element 18 has the appearance of a flat oval in respect of its cross-section. On one end of the positive-engagement hollow element 18 a free end is provided. The opposite end of the hollow element is provided with the base structure 35. The shanks 40 and 41 of the transitional part 38 run in a tapering fashion in the direction of the positive-engagement hollow element 18. The hollow element 18 has a flat, extended wedge-shaped basic form, which ensures secure passage when bringing together the roof parts 2, 3 and 3, 4 with a small opening cross-section in the receiving means 42. The receiving means 42 may be provided with an insert 43 having a cross-sectional form that is undercut opposite its entrance opening 44.

The cavity 39 in this cross-sectional form continues into the base structure 35. A relatively thick-walled arrangement of the shanks 40 and 41 of the transitional part is possible, regardless of the pressure-dependent expansion of the positive-engagement hollow element 18. The hollow element 18 functions as a cover for the gap-shaped transition 30 and provides a very robust connection. Additional protection may be provided by appropriate coating or reinforcement, although this is not shown here in any greater detail. The shanks 40 and 41 preferably extend into the entrance opening 44 in the region of the thinner-walled area of the positive-engagement hollow element 18. In the presence of internal pressure, the shanks 40 and 41 form a comparatively stable bridge, which also contributes to the alignment of the roof parts 2, 3 and 3, 4 vertically in relation to one another. In addition, application of internal pressure results in the bracing of both the base structure 35 and the positive-engagement hollow element 18 against the associated holding means 36 and receiving means 42. A highly durable connection is achieved in the direction of extension of the roof.

The pressure supply is illustrated in FIG. 11, by analogy with the representation in accordance with FIG. 2, but the pressure supply is provided by hydraulic means. For example, a positioning cylinder 45 actuates a differential piston unit 46 as a pressure transformer, which is connected to the cavities 39 of the locking elements 6 in each case by connection lines 47 and 48.

The previously described embodiments are based in each case on an essentially symmetrical construction of the locking elements 6. The locking elements 6 may be of a locally symmetrical construction. A central stiffening structure 20 may be provided as part of the balloon-shaped locking elements, or as a mirror symmetrical construction with a stay running for the entire length of the tube-shaped locking elements forming the bridging part 58.

Figure 17:
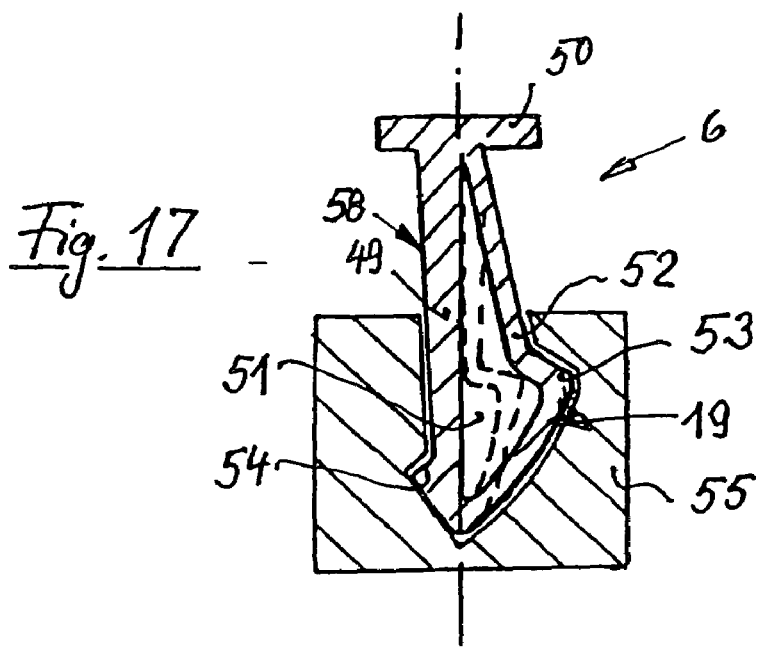
FIG. 17 shows a separate, highly schematic representation of a positive-engagement hollow element in a further arrangement in accordance with the invention.

FIG. 17 illustrates an alternative embodiment that stands out for its particular simplicity, and in which the positive-engagement hollow element, identified here with the designation 19, is formed on the one hand by a bearing or supporting wall 49. The wall 49 forms a bridging part 58 that extends from the base structure 50. The bridging part 48 preferably exhibits a certain degree of elasticity in a transverse direction. The bearing and supporting wall 49 defines one side of a cavity 51. The cavity 51 is capable of being subjected to pressure and is defined on the opposite side by a flexible defining wall 52. Wall 52 extends in the area between the base structure 50 and the end of the bearing and supporting wall 49. The defining wall 52 is preferably elastically pre-tensioned, in particular in its starting position—shown here as a broken line—adjacent to the bearing and supporting wall 49, and is capable of being extended from this starting position, depending on the pressure. A stop step 53 is provided as an undercut surface of a receiving means 55. In a corresponding fashion, the bearing and supporting wall 49 can also be provided on its opposing side with a stop step 54. A locking element 6 of this kind may be appropriate in arrangements made in accordance with FIGS. 11 to 14. This embodiment offers an advantageous possibility of maintaining the locking state via the locking means 54, in conjunction with which the bearing and supporting wall 49 and thereby permits secure and protected bridging of the transition 30 between consecutive roof parts.

Although the invention is explained in the foregoing only in relation to roof parts as covering elements and covers, it can also be used with advantage for other covers, doors or the like.

Taken on the whole, a sealing and/or locking system for vehicles with a vehicle opening on the body structure is provided by the invention. The system's function is pressure-dependent. Vehicle elements that require sealing or locking in relation to one another are connected via locking elements. The locking elements have positive-engagement hollow elements and a stiffening bridging means in the transitional area between parts of the vehicle that are to be connected together. The invention is intended to cover locking elements as such that are used in the system. In particular, the invention is intended to cover the arrangements indicated in the illustrative embodiments and other alternatives that are mentioned in conjunction with the illustrative embodiments.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sealing and locking system for a vehicle having a body structure that defines an opening that may be selectively closed by a cover, the cover being fixed to an adjoining component, the system comprising:
   a flexible positive-engagement member having a hollow portion, the positive-engagement member having a cross-section that is capable of being varied depending upon an internal pressure provided to the hollow portion, the positive-engagement member having a base structure;
   the cover having a holder that accommodates the base structure;
   the adjoining component having a receiver; and
   wherein the positive-engagement member has a dimensionally stable bridging part that projects from the base structure towards the receiver, and wherein the bridging part is connected to the positive-engagement member.

2. The sealing and locking system of claim 1 wherein the bridging part narrows starting from the base structure.

3. The sealing and locking system of claim 1 wherein the bridging part is a stiffening structure formed as a support.

4. The sealing and locking system of claim 1 wherein the bridging part has a stay-shaped stiffening portion.

5. The sealing and locking system of claim 4 wherein the stay-shaped stiffening portion is defined laterally within the positive-engagement member.

6. The sealing and locking system of claim 4 wherein the bridging part extends between mutually opposing parts of the positive-engagement element that are capable of being varied in their form by being subjected to pressure.

7. The sealing and locking system of claim 4 wherein the positive-engagement element has the stiffening portion for at least partially annular surrounding structures.

8. The sealing and locking system of claim 4 wherein the positive-engagement element is so arranged as to be oriented along the stay-shaped stiffening portion forming the bridging part.

9. The sealing and locking system of claim 4 wherein the positive-engagement element encloses the stiffening portion forming the bridging part essentially in the form of a balloon.

10. The sealing and locking system of claim 4 wherein the positive-engagement element is oriented along the stay-shaped stiffening portion essentially in the form of a tube.

11. The sealing and locking system of claim 10 wherein the positive-engagement hollow element is connected to the base structure and to the area of the stiffening portion that is remote from the base structure.

12. The sealing and locking system of claim 1 wherein the bridging part forms a transitional part between the base structure and the positive-engagement member.

13. The sealing and locking system of claim 12 wherein the positive engagement member is attached to the end of the transitional part.

14. The sealing and locking system of claim 13 wherein the a stiffening structure forming a stay has a slot that is oriented in a longitudinal direction within the stay.

15. The sealing and locking system of claim 1 wherein the bridging part is elastically dimensionally stable.

16. The sealing and locking system of claim 1 wherein the receiver for the positive-engagement member has an insert piece.

17. The sealing and locking system of claim 1 wherein the receiver for the positive-engagement member has an undercut portion.

18. The sealing and locking system of claim 1 wherein the cover is a roof.

19. The sealing and locking system of claim 18 wherein the adjoining component that adjoins the roof and is formed, in part, by a windscreen cowl top panel of the body structure of the vehicle.

20. The sealing and locking system of claim 18 wherein the adjoining component that adjoins the roof and is formed, in part, by a part of the rear of the body structure of the vehicle.

21. The sealing and locking system of claim 18 wherein the adjoining component is formed, in part, by a further roof part.

22. The sealing and locking system of claim 1 wherein the hollow portion of the positive-engagement member is subjected to positive pressure.

23. The sealing and locking system of claim 1 wherein the hollow portion of the positive-engagement member is subjected to a partial vacuum.

24. The sealing and locking system of claim 1 wherein the bridging part formed with means for aiding passage of the positive-engagement member relative to the receiver.

25. The sealing and locking system of claim 1 wherein the bridging part forms a locking element that is loaded elastically into a position behind the receiver.

* * * * *